United States Patent [19]

Yamada et al.

[11] Patent Number: 5,121,153
[45] Date of Patent: Jun. 9, 1992

[54] AUTOMATIC FOCUSING DEVICE

[75] Inventors: Masatoshi Yamada; Takamichi Takehana, both of Okaya, Japan

[73] Assignee: 501 Chinon Kabushiki Kaisha, Nagano, Japan

[21] Appl. No.: 634,481

[22] Filed: Dec. 26, 1990

[30] Foreign Application Priority Data

Jan. 17, 1990 [JP] Japan ................. 2-8021

[51] Int. Cl.$^5$ .................................. G03B 13/36
[52] U.S. Cl. ................................... 354/403
[58] Field of Search ............... 354/403; 358/227

[56] References Cited

U.S. PATENT DOCUMENTS

4,518,242 5/1985 Toyama ......................... 354/403
4,592,638 6/1986 Kaneda et al. ................. 354/403

Primary Examiner—W. B. Perkey
Attorney, Agent, or Firm—Morrison Law Firm

[57] ABSTRACT

An automatic focusing system includes an active range finding system and a passive range finding system. An initial measurement is made by the active range finding system. If the initial measurement indicates that the lens focus is within a predetermined scope, control of further focusing is transferred immediately to the passive range finding system. If this condition is not met initially, lens focusing begins based on data from the active range finding system. The difference between measured range and the distance at which the lens is focused is monitored. When this difference falls below the predetermined scope, the range finding function is transferred to the passive range finding system. Also, the variance between the distance measured by the active range finding system and the distance at which the lens is focused is used to determine a degree of blur. If the degree of blur is less than a predetermined blur, the range finding function is transferred to the passive range finding system. In one embodiment, the active range finding system employs a plurality of spaced-apart light emitters that illuminate physically spaced-apart objects.

3 Claims, 5 Drawing Sheets

AUTOMATIC FOCUSING DEVICE

BACKGROUND OF THE INVENTION

1. Field of the Invention

The present invention relates to an automatic focusing device for a camera such as, for example, a still camera, a video camera, etc., and more particularly to an automatic focusing device having an active range finding system utilizing triangulation and a passive range finding system utilizing image phase difference detection for operating the focusing mechanism according to thus obtained range data.

2. Description of the Prior Art

An example of a conventional automatic focus adjusting device is described in Japanese Patent Publication Laid-Open No. 212912/1988, which discloses a device having an active range finding system utilizing triangulation and a passive range finding system utilizing image phase difference detection for operating the focusing mechanism according to thus obtained range data. Initially, this system attempts to focus on an object using data from the passive range finding system. If the distance to the object cannot be obtained by the passive range finding system, the system uses its active range finding system to acquire range information. It then adjusts the lens focus to a predetermined extent according to the range data obtained from the active range finding system. Finally it adjusts the focus once again using range data from the passive range finding system.

The device first measures the distance to the object using passive range finding. If the result of the passive range measurement produces an unacceptably large degree of blur, which means focusing by the passive range finding system is difficult, then range data is taken from the active range finding system to move the focus to a point where focusing by the passive range finding system is possible. If the initial passive range measurement provides a small enough degree of blur, focusing can be completed using only passive range finding without requiring the use of the active range finding system.

In case of, for example, a 100 mm telephoto lens, the degree of blur detectable by the passive image phase difference detecting method is not satisfactory over the entire distance range from infinity to the closest focusing distance. With the above procedure, this inadequacy of the passive ranging system is overcome by resort to the active range finding.

Passive range finding is used unless it is found that the degree of blur is too large to permit satisfactory focus. When the degree of blur is very large, a tremendous amount of passive range data to make the decision to use the active range finding system. The large amount of passive range data requires a long time to calculate. As a consequence, ranging can take a substantial length of time.

The active range finding system, using triangulation, presents a problem of so-called background focusing due to focusing past the desired object. Background focusing is caused when light emitted to determine the distance to an object misses the object an strikes the background. This commonly happens when the object to be photographed consists of two persons standing side by side with the background showing between them, or in similar situations. Avoidance of background focusing demands careful attention from the photographer, thus increasing the workload of the photographer.

An active range finding system has a range measurement limit at the long-distance end of its range. This long-distance range limit results from the limited amount of emitted light available from suitable light emitting elements.

The active range finding system also has a problem at the short-distance end of its range due to parallax problems. Parallax problems are caused by positional relations between the range finding area and the object.

The above facts can also mean that it is possible for an active range finding system to be sufficiently effective at relatively close distance. The problem of background focusing due to focusing past the object can be overcome by increasing the range measuring distance by, for example, increasing the number of light emitting elements. An example of such method is disclosed in Japanese Patent Publication Laid-Open No. 223734/1987 owned by the applicant of the present invention.

Unlike active range finding systems, passive range finding systems are characteristically free from problems of parallax and are able to measure the range to the center of an object located anywhere from the closest focusing range to infinity. However, the area over which they are capable of measuring range is relatively small. An attempt to increase the measurable area presents new problems, such as an increase in the number of range finding image sensor elements.

OBJECTS AND SUMMARY OF THE INVENTION

As described above, both active and passive range finding systems have their respective advantages and drawbacks and, so far, it has been difficult to take full advantage of their characteristics by a mere combination of the two systems.

It is an object of the present invention to provide an automatic focusing device that takes advantage of the characteristics of active and passive range finding systems to their full extent and is able to attain accurate focusing in a range from the closest focusing distance to infinity, while requiring no more than a simple operation even when taking snapshots.

An automatic focusing device according to the present invention consists of an active range finding system combined with a passive range finding system. The active range finding system utilizes triangulation for determining the distance to an object to be photographed. A light emitting element or elements emits a light beam to the object. Light reflected back from the object is detected by a photoelectric converting element. The passive range finding system utilizes image phase difference detection. It determines the degree of blur by forming a plurality of images of the object received along plurality of different light paths, and then detects each of these images using photoelectric converting elements. The outputs of the photoelectric converting elements are used to determine the phase difference between the images. A focusing mechanism drives a focusing lens inside a photographic lens to a focus according to either the active or passive range finding system. A range judging means determines whether range data from the active range finding system is within a preset range limit. If the range data is outside the preset range limit, the focusing mechanism drives the focusing lens in a direction to place the range data within the preset limit. When the range data comes within the preset limit, control of the focusing drive mechanism is transferred to the passive range finding system. If the initial range data from the active range finding system is within the preset limit, control of the focusing drive mechanism is assumed immediately by the passive range finding system. A movement measuring means measures the distance moved by the focusing lens. A comparing means calculates the actual variance between data of the current position of the focusing lens, based on the measured movement, and range data obtained by the active range finding system as well as determining the relative magnitude between thus calculated actual variance and a preset degree of blur. A focus operation switching means transfers control of the focusing mechanism in accordance with the active range finding data either when the range judging means judges the measured distance to be within the preset range or when the result of said judgement is negative and the variance is judged by the comparing means to be greater than the preset degree of blur. Once these conditions are met the focusing mechanism performs the focusing operation in accordance with the passive range data either when, following the judgement of the range judging means for measured range is outside of the limit, focusing operation of the focusing mechanism according to the active range data is completed and the passive range finding system judges the lens to be still in an unfocused state, or when said variance is judged by the comparing means to be smaller than the preset degree of blur.

According to the present invention, the range to the object is measured first by the active range finding system, and if the measured range turns out to be in within a specified scope, focusing operation by the active range finding system is performed. If the result turns out to be beyond the scope, however, the variance between the active range data and the current lens position data is computed and judgment is made as to whether said variance is smaller than a preset variance (preset degree of blur). If the result turns out to be smaller than the preset variance, focusing operation by the passive range finding system is performed immediately. In case of greater variance than the preset variance, the lens is moved in the focusing direction according to the range data obtained by the active system, and then the passive range finding system is actuated so that focusing operation according to range data obtained by the passive system is performed.

Briefly stated, the present invention provides an automatic focusing system having an active range finding system and a passive range finding system. An initial measurement is made by the active range finding system. If the initial measurement indicates that the lens focus is within a predetermined scope, control of further focusing is transferred immediately to the passive range finding system. If this condition is not met initially, lens focusing begins based on data from the active range finding system. The difference between measured range and the distance at which the lens is focused is monitored. When this difference falls below the predetermined scope, the range finding function is transferred to the passive range finding system. Also, the variance between the distance measured by the active range finding system and the distance at which the lens is focused is used to determine a degree of blur. If the degree of blur is less than a predetermined blur, the range finding function is transferred to the passive range finding system. In one embodiment, the active range finding system employs a plurality of spaced-apart light emitters that illuminate physically spaced-apart objects.

According to an embodiment of the invention, there is provided an automatic focusing system for a lens comprising: an active range finding system, a passive range finding system, means for performing an initial range measurement by the active range finding system, focusing means for driving a focus of the lens according to range data from either the active range finding system and the passive range finding system, means for judging whether the initial range measurement is within a predetermined scope, means for updating a calculated current distance at which the lens is focused, means for transferring control of the focusing means immediately to the passive range finding system if the initial range measurement is within the predetermined scope, means for calculating a degree of blur produced by a variance between the measured range and the calculated current distance, and means for transferring range measurement to the passive range finding system when either of the two following conditions exist: 1) the measured range varies from the calculated distance by no more than a predetermined amount, or 2) the degree of blur is less than a predetermined degree of blur.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
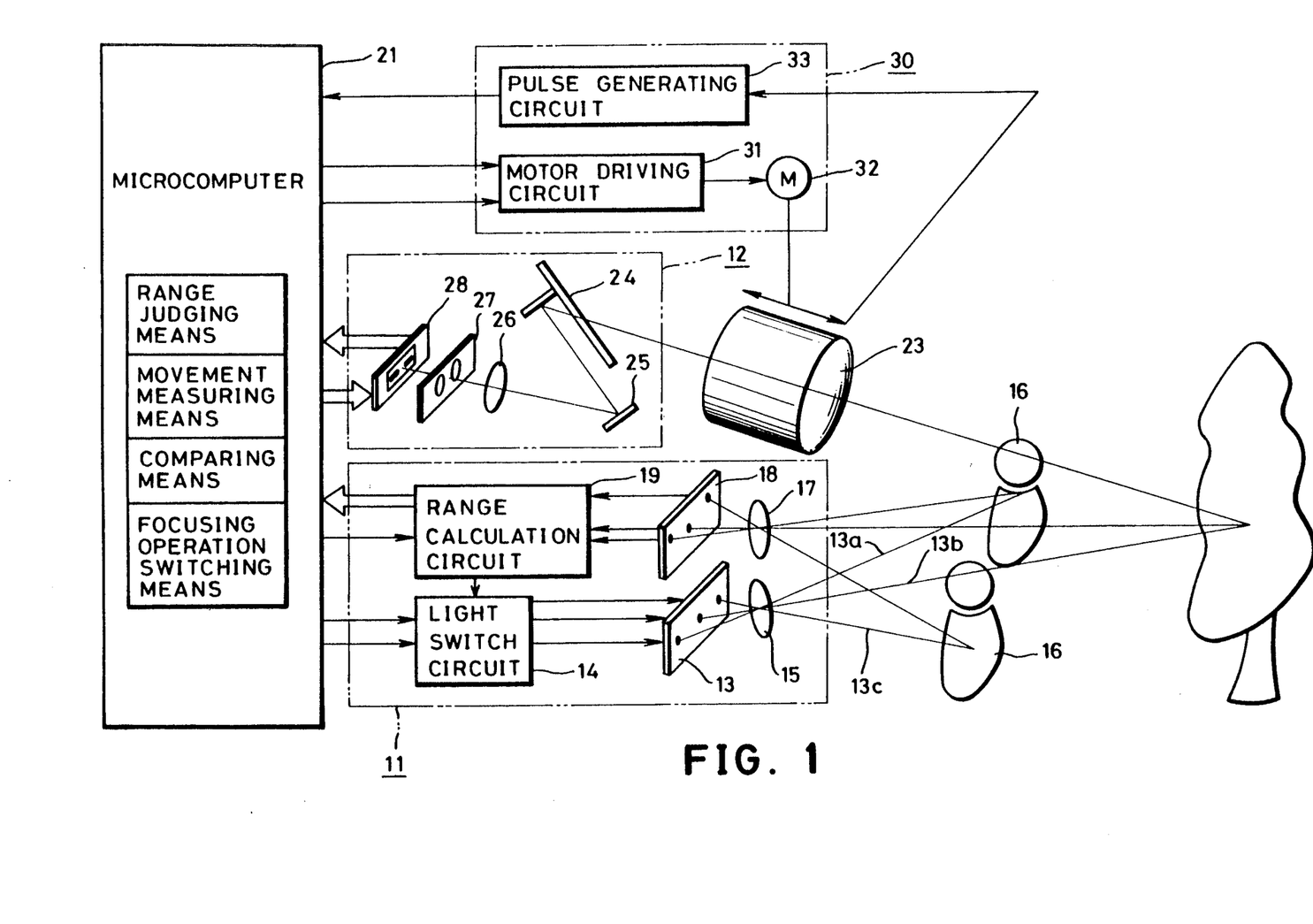
FIG. 1 is a block diagram showing an automatic focusing device according to an embodiment of the present invention.

Referring to FIG. 1, an automatic focusing device includes an active range finding system 11, utilizing triangulation, and a passive range finding system 12, utilizing image phase difference detection.

Active range finding system 11 is basically the same as the one disclosed in Japanese Patent Publication Laid-open No. 223734/1987, of common assignee with the present invention. A plurality (three according to the embodiment shown in the attached drawings) of light emitting elements 13 are disposed in a direction orthogonally intersecting the base length of triangulation. The light emitting elements are actuated in sequence by a light switch circuit 14. Light beams 13a, 13b, 13c, such as infrared rays, from light emitting elements 13 are emitted through a light emitting lens 15 to one or more objects 16 to be photographed. Light beams reflected from object 16 pass in sequence through a light receiving lens 17 to a photoelectric converting element 18. Photoelectric converting element 18 is shaped to receive all the light beams reflected from object 16 and produces range signals delta I1 and delta I2 for distances to object 16 in accordance with respective incidence positions of reflected light beams from object 16. Photoelectric converting circuit 18 applies the range signals to standard range calculation circuit 19. Range calculation circuit 19 converts the range signals to an m-bit digital signal for application to a microcomputer 21.

Light switch circuit 14 and range calculation circuit 19 perform specified controlling activities in accordance with commands produced by microcomputer 21 with a timing to be described hereinafter.

Passive range finding system 12 employs image phase difference detection to determine range to object 16. Images of object 16 enter a photographic lens 23 and are reflected by a quick return mirror 24 and an auxiliary mirror 25 and through a projecting lens 26 to a pair of image focusing lenses 27. Image focusing lenses 27 form a plurality of images on photoelectric converting element (hereinafter called image sensors 28). Each image thus formed arrives along different paths. The amount of blur in the image is determined by the phase difference between respective images detected by the image sensors 28.

Commands to actuate image sensors 28 are produced by microcomputer 21 with a timing to be described hereinafter. The degree of blur resulting from actuation of image sensors 28, in other words, measured range data, is input to microcomputer 21.

A focusing mechanism 30 includes a motor driving circuit 31 controlled by range data from microcomputer 21. The range data may be derived either from active range finding system 11 or passive range finding system 12. A lens driving motor 32 is responsive to control signals from motor driving circuit 31 to move a focusing lens (not shown in FIG. 1) within photographic lens 23, which is described later, to move toward the focus position.

Focusing mechanism 30 includes a pulse generating circuit 33 which produces a number of pulses of a pulse signals corresponding to the distance over which the focusing lens is moved.

Figure 2:
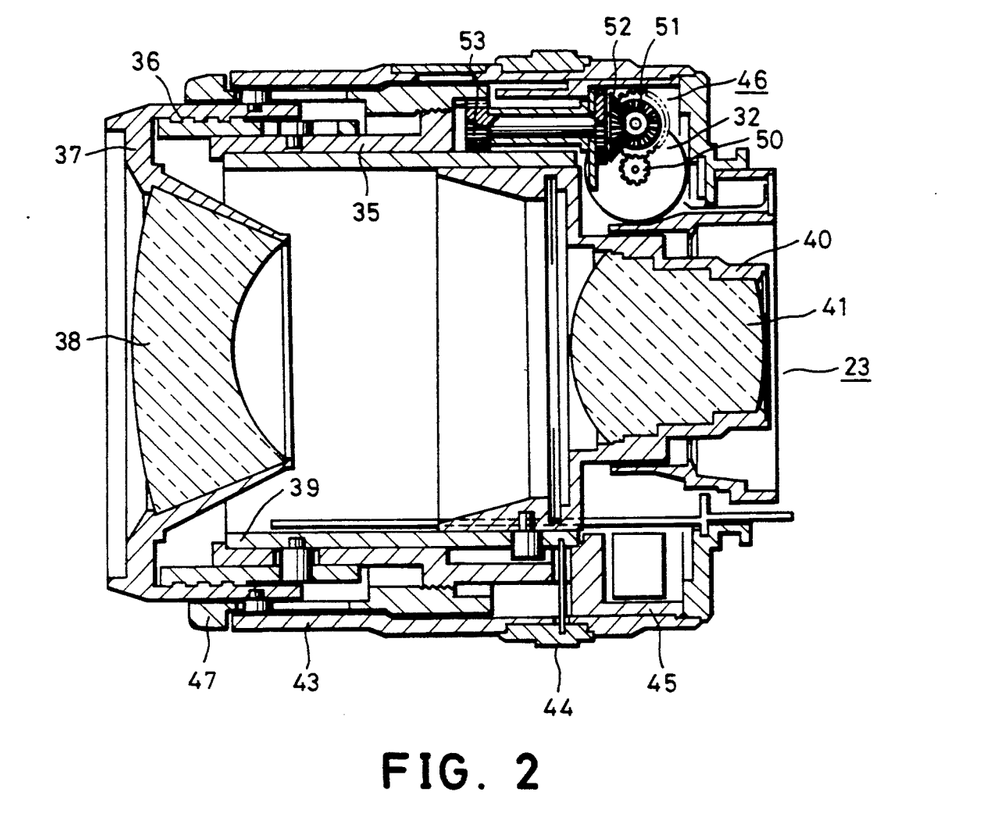
FIG. 2 is a longitudinal cross section showing a photographic lens which may be used in the automatic focusing device of FIG. 1.

Referring now to FIG. 2, photographic lens 23 includes a front frame 37 attached to the front part (the left part of FIG. 2) of a fixed cylinder 35. A multiple lens element 38 is affixed to fixed cylinder 35 with helicoid 36 therebetween. A zoom cam cylinder 39 is disposed inside fixed cylinder 35. Zoom cam cylinder 39 is revolvable about an axis of fixed cylinder 35.

A rear frame 40 is connected to the rear part (the right part of the FIG. 2) of zoom cam cylinder 39. Rear frame 40 supports a multiple lens element 41. Zoom cam cylinder 39 is integrally coupled to a zoom ring 44 revolvably attached around the outer surface of a fixed external cylinder 43. Zoom cam cylinder 39 causes zooming when rotated whereby multiple lens elements 38 and 41 disposed at front frame 37 and rear frame 40, respectively, are moved forward and backward by cam movement.

Lens motor 32 is supported by a fixed seat 45 inside the rear part of fixed external cylinder 43. Lens motor 32 rotates a range ring 47, revolvably disposed inside fixed external cylinder 43, through a gear mechanism 46. Range ring 47 is integrally coupled with front frame 37. Front frame 37 revolves around helicoid 36 together with the revolving movement of range ring 47, thereby causing focusing.

Figure 3:
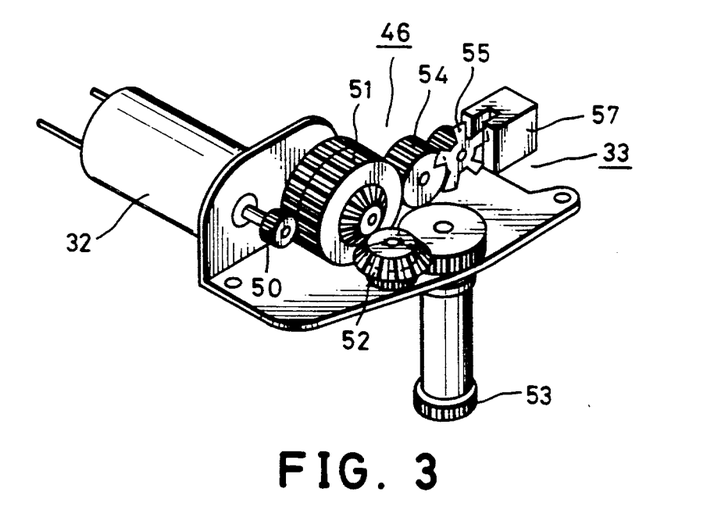
FIG. 3 is an oblique view showing the gearing mechanism of FIG. 2.

Referring now to FIG. 3, gear mechanism 46 has a pinion gear 50 integrally formed with a shaft of lens driving motor 32. A gear train from pinion gear 50 includes, in order, pinion bevel gears 51 and 52, and a pinion gear 53. Pinion gear 53 drives range ring 47 (FIG. 2). Pinion bevel gear also engages an idle pinion 54 which, in turn, drives an impeller 55. Impeller 55 is disposed before a groove-shaped detecting portion of a photo interrupter 57. Although not shown in the figures, light emitting element(s) and light receiving element disposed facing each other across the groove-shaped detecting portion of photo interrupter 57. As each blade of impeller 55 rotates through photo interrupter 57, the resulting chopping of light received by the light receiving element produces a pulsed electrical signal.

The rotation of impeller 55, and the number of pulses produced by photo interrupter 57, correspond exactly to the distance over which of the focusing lens is moved during focusing. The combination of impeller 55 and photo interrupter 57 comprise pulse generating circuit 33.

Microcomputer 21 counts the number of pulse signals produced by pulse generating circuit 33 and regards a result of the counting as the distance that the focusing lens is moved.

Microcomputer 21 also performs a range judging function wherein it judges whether range data obtained by active range finding system 11 is within a prespecified scope. Furthermore, microcomputer 21 monitors, through the distance moved by the focusing lens, computes the variance between the computed current position of the lens and the range data measured by active range finding system 11. Microcomputer 21 then compares the computed variance and a preset degree of blur to determine which is greater.

Microcomputer 21 further controls focusing operation switching. The focusing operation switching selects the appropriate one of the active or passive range data for controlling focusing mechanism 30. Active range data is selected when the judging means judges that the active range data is within specified bounds or when the range data is judged to be out of the scope while its variance at the calculated current position of the focusing lens is judged by the comparing means to be greater than a preset degree of blur.

When, following a determination, based on active range data, that the active range data is outside of the scope, and the device is still unfocused, control of focusing mechanism 30 is transferred from active range finding system 11 to passive range finding system 12. Control is also transferred to the passive range finding system when the comparing means judges the variance to be smaller than the preset degree of blur.

Figure 4:
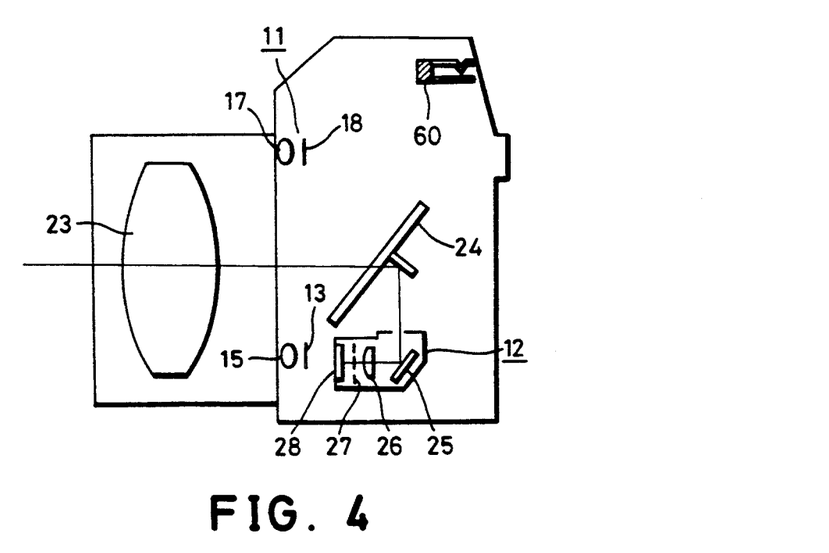
FIG. 4 is a schematic side view of a camera equipped with the device of FIG. 1.

Referring now to FIG. 4, an outline of a camera is shown having an automatic focusing device with an active range finding system 11 and a passive range finding system 12. A spot selecting button 60 is provided for photographing a flat or nearly flat object, such as, for example, a wall painting. When spot selecting button 60 is turned ON, control of range is immediately assumed by passive range finding system 12, even if the distance to the object is within the scope of range finding by active range finding system 11 (N1_=A_=N2).

Referring now to FIGS. 5A and 5B, relationships are shown between output signals generated by passive range finding system 12 on the two image sensors 28 shown in FIGS. 1 and 4. FIG. 5A shows the output signals when the system is in a focused state and 5B shows the output signals when the system is in an unfocused state. An image of the object coming through photographic lens 23 is reflected by quick return mirror 24 and auxiliary mirror 25 through projecting lens 26 and a pair of focusing lenses 27 onto respective image sensors 28. The two mirrors 24, 25, form a TTL-AF optical system.

If photographic lens 23 is in a focused state, the phase difference between outputs A1 and A2 of the pair of image sensors 28 is approximately zero, as shown in FIG. 5A. If photographic lens 23 is in unfocused state, a phase difference X results between outputs A1 and A2. This phase difference X is applied to microcomputer 21 as measured range data.

Figure 6:
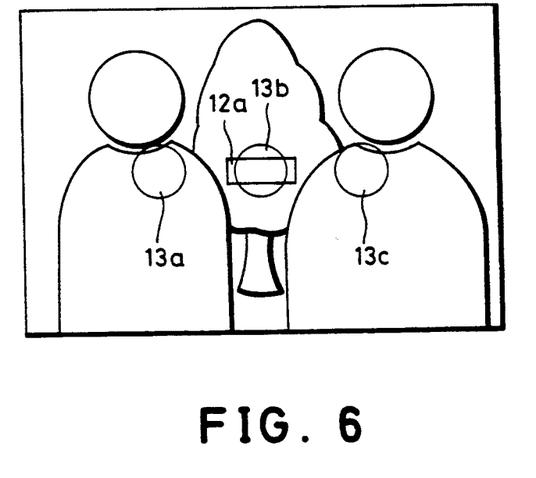
FIG. 6 is an explanatory drawing of range finding at relatively close range.

Referring now to FIG. 6 a condition is shown wherein the distance to relatively close objects (for example 1.06 m to 3.53 m) is to be measured. Numerals 13a, 13b and 13c in the drawing denote respective range measuring points illuminated by light emitting elements 13 of active range finding system 11. According to the example shown in the drawings, the two range measuring points, 13a and 13c, contain the objects, i.e. the two persons, to which range measurement is desired. The other measuring point 13b contains only the background. Range data obtained from the two range measuring points, 13a and 13b, those closer to the camera, are normally used for focusing.

Numeral 12a represents the area covered by passive range finding system 12. It sometimes is unavoidable, when the objects are side by side at a close distance, that the passive system measures the distance to the background instead of to the objects.

Figure 7:
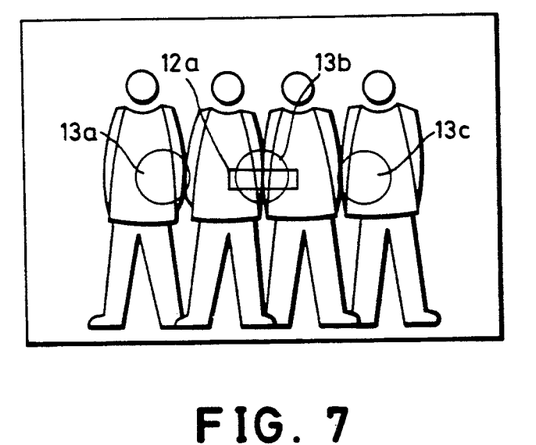
FIG. 7 is an explanatory drawing of range finding at a range greater than that of FIG. 6.

Referring now to FIG. 7, a condition is shown wherein the objects are located at a longer distance (for example approximately 7 m) than the above case. The numerals in the drawing denote the same elements as those shown in FIG. 6. When the objects are at a long distance, such as the above case, range finding area 12a of passive range finding system 12 may contain the objects, i.e. the standing people, in spite of space between the persons.

Figure 8:
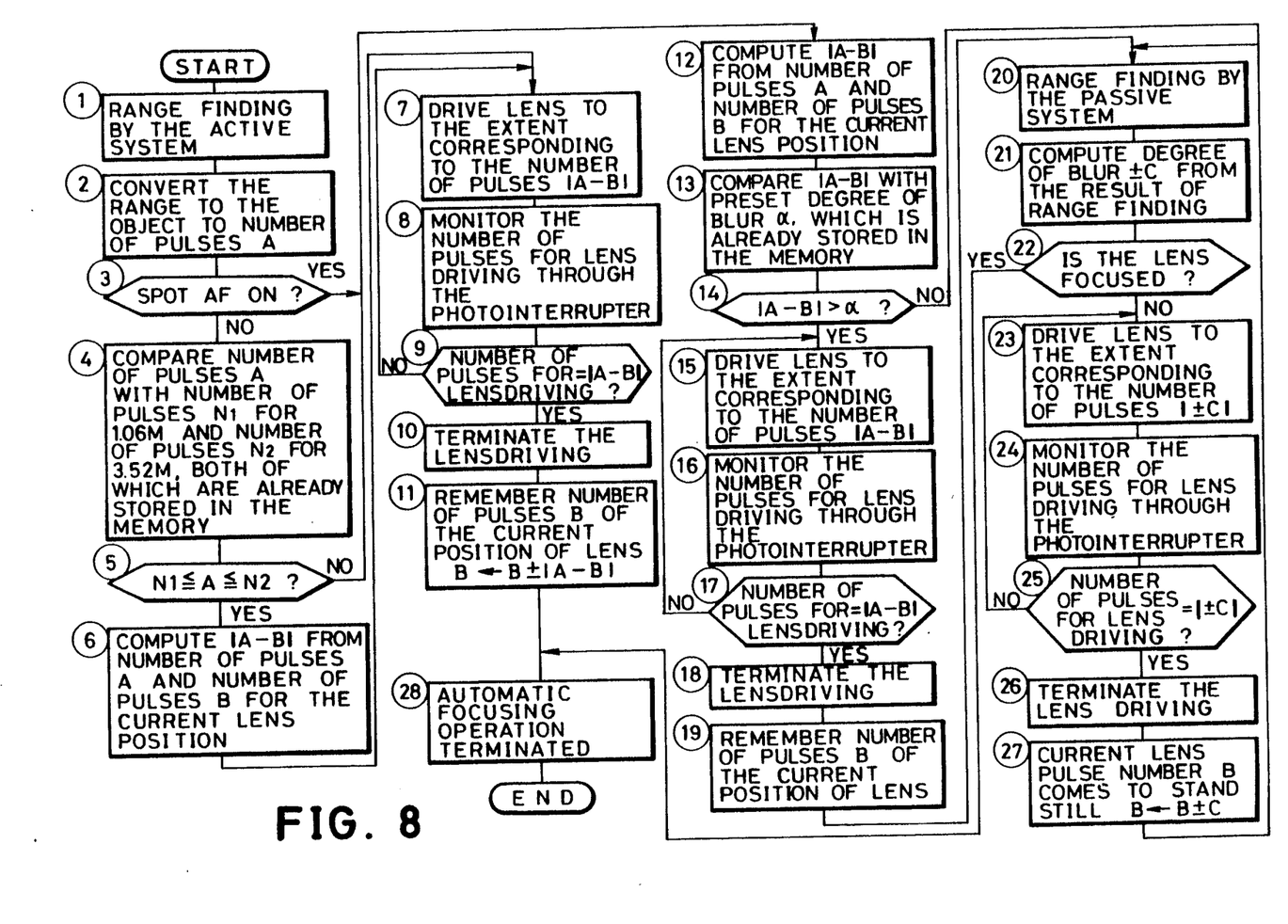
FIG. 8 is a flow chart to which reference will be made in explaining the operation of the device of FIG. 1.

The operating sequence of the device is described hereunder, referring to FIG. 8. First, microcomputer 21 commands active range finding system 11 to measure the distance to the object. Active range finding system 11 performs the prefixed measuring operation (step 1). Range calculating circuit 19 outputs m bit of object range data, corresponding to the distance to object 16, to microcomputer 21. Microcomputer 21 converts the m bits of object range data as the number of pulses A (step 2) through which the lens must be moved. Microcomputer 21 also judges at the time of range finding whether the spot AF is turned on. If the spot AF is turned on by actuating spot selecting button 60 (FIG. 4), active range finding system 11 is turned off, and all range finding is performed by passive range finding system 12. Spot AF is normally turned off when taking snapshots or other similar situations. This ensures that active range finding is done first, followed, at the appropriate time, by passive range finding.

Next, judgment is made as to whether the range (number of pulses A) is within specified limits N1 to N2 (for example, N1=1.06 m and N2=3.53 m as above) (step 4 and 5).

As described above, the position of the focusing lens is monitored through the number of pulses produced by pulse generating circuit 33. The relation between the position of the lens and number of pulses is such that the number of pulses produced while adjusting the lens from the closest focusing distance to infinity is 1,600. The numbers of pulses for positioning the lens to equal the distances to each object, is remembered in memory (not shown) as the lens position data. The number of pulses A corresponding to range data from active range finding system 11 is equal to the number of pulses representing the lens position when the lens position is adjusted to the distance to the object. For example, if the distance to the object is 1.3 m, the lens position data in the focused state is 948 according to the following chart. Accordingly, when the active range finding system 11 measures a distance of 1.3 m, the number of pulses A representing this range is also 948 (step 3).

CHART

| range (m) | number of pulses | active | passive |
|---|---|---|---|
| 0.86 | 1592 | 1592 | |
| 0.89 | 1528 | | |
| 0.92 | 1462 | 1462 | ↑ |
| 0.95 | 1396 | | ↑ |
| 0.98 | 1330 | 1330 | ↑ |
| 1.02 | 1266 | | ↑ |
| 1.06 | 1210 | 1210 | ↑ |
| 1.11 | 1144 | | ↑ |
| 1.16 | 1078 | 1078 | ↑ |
| 1.23 | 1012 | | ↑ |
| 1.30 | 948 | 948 | ±500 pulses |
| 1.38 | 882 | | ↓ |
| 1.47 | 816 | 816 | ↓ |
| 1.56 | 760 | | ↓ |
| 1.69 | 694 | 694 | ↓ |
| 1.84 | 630 | | ↓ |
| 2.03 | 564 | 564 | ↓ |
| 2.27 | 498 | | ↓ |
| 2.59 | 432 | 432 | ↓ |
| 2.94 | 376 | | |
| 3.52 | 312 | 312 | |
| 4.40 | 246 | | |
| 5.39 | 198 | 198 | |
| 7.43 | 142 | 198 | |
| 10.0 | 106 | 198 | |
| 20.0 | 52 | 198 | |
| ∞ | 0 | 198 | |

In step 5 the number of pulses A corresponding the range data is compared with N1=1210 and N2=312. If the number of pulses A falls between these values, focusing is performed using the range data A from active range finding system 11. Active range data can be used between these limits because the problems of parallax and long-range limits do not occur.

As noted previously, the long-range problem of active range finding system 11, i.e. background focusing due to focusing past the object as shown in FIG. 1, may be overcome by increasing the amount of emitted light using a plurality of light emitting elements 13 arranged side by side to change the range measurable area so that distance to objects with its background located in the center of the finder, such as, for example, two persons standing side by side, is correctly measured as shown in FIG. 6 and that focusing is performed correctly. With such an addition, the range limits discussed in the preceding paragraph may be increased.

Focusing operation according to such range data A as explained as above is performed as follows: first, the number of pulses A, representing measured range, is compared with a number of pulses B representing the current position data of the focusing lens inside photographic lens 23. Their variance $|A-B|$ is computed (step 6). Then, focusing mechanism 30 is operated over the number of pulses $|A-B|$ of the variance from current position data b, so that the focusing lens is moved to a position corresponding to active range data A (step 7). During this movement, pulse generating circuit 33 produces a number of pulses corresponding to the distance moved by the lens, and that number is monitored (step 8).

Operation of focusing mechanism 30 is terminated when the number of monitored pulses equals the variance $|A-B|$ (steps 9 and 10).

Following the above described operation in the focusing direction, $B+-|A-B|$ is computed. The resulting value stored as the revised current lens position data B (step 11).

With the above procedure completed, the focusing lens is focused. The automatic focusing operation is terminated (step 28).

When the result of comparison at step 5 shows that the range data A is outside the specified scope N1 to N2, or when the spot AF is found to be turned on at step 3, the following operation is performed:

First, the number of pulses A corresponding to the active range data and current position data (number of pulses) B of the focusing lens inside photographic lens 23, and the variance $|A-B|$ is computed (step 12). Then, said variance $|A-B|$ is compared with a preset variance (degree of blur a) (step 13 and 14). If $|A-B|$ turns out to be greater than a, the focusing lens is driven in the focusing direction according to the active range data A. In other words, focusing mechanism 30 is driven a distance equal to the number of pulses in the variance $|A-B|$. In that way, current lens position data B is changed to equal active range data A (step 15). During this movement, pulse generating circuit 33 produces a number of pulses corresponding to the distance over which the lens is moved. The number of pulses produced by pulse generating circuit 33 is monitored (step 16). Operation of focusing mechanism 30 is terminated when the number of monitored pulses has reached the figure equivalent to variance $|A-B|$ (step 17 and 18).

Figure 5:
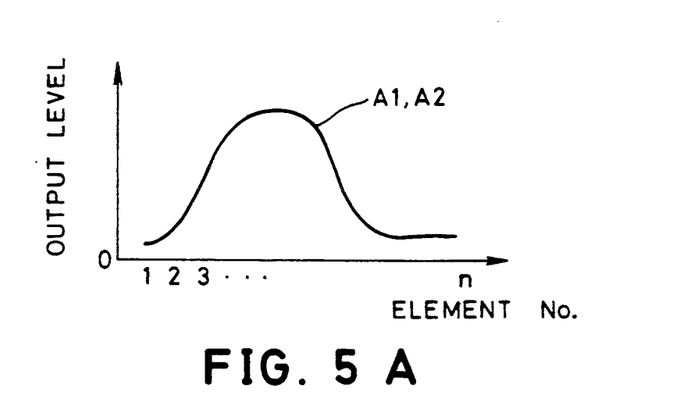
FIGS. 5A and 5B are curves to which reference will be made in explaining the operation of the passive range finding system used in the present invention.

Following the above described movement in the focusing direction, $B+-|A-B|$ is computed. The value produced by the computation is stored as the revised current lens position data B (step 19). As the next step, microcomputer 21 commands passive range finding system 12 to measure the distance. Passive range finding system 12 performs its measuring operation (step 20) and computes the degree of blur $+-C$ according to the phase difference X between outputs A1 and A2 shown in FIG. 5 (step 21).

Passive range finding system 12 performs the same range same measuring operation when variance $|A-B|$ is judged to be not greater than preset degree of blur a at step 14, above. In other words, operation of passive range finding system 12 is actuated either when the operation in the focusing direction based on the active range data is completed or when variance $|A-B|$ is smaller than a preset degree of blur a.

Following the range measuring operation by passive range finding system 12, judgement is made as to whether the degree of blur $+-C$ is zero. If the degree of blur is zero, the lens is focused (step 22). If the lens is found to be focuses, the focusing operation is terminated without further action (step 28).

If the lens is not yet in a focused condition, however, focusing mechanism 30 is operated to the extent corresponding to the number of pulses for said degree of blur $+-C$, using range data measured by passive range finding system 12, until the lens is brought into focus (step 23). At this time too, the number of pulses generated by pulse generating circuit 33 correspond to the distance over which the lens is moved, and that number is monitored (step 24). Operation of focusing mechanism 30 is terminated when the number of monitored pulses reach a value equal to the degree of blur $+-C$ (step 25 and 26).

Following the above operation in the focusing direction, $B+C$ is computed. The value produced from the computation is stored as the revised data B of the current position of the lens (step 27). The system returns to step 20 to repeat the range finding operation by the passive range finding system 12. Steps 20 to 27 are repeated until the lens is judged to be in focus at step 22.

The degree of blur a, which is used as a standard for judgment at step 14, is set at approximately 500 pulses as shown in the chart. For purposes of explanation, let us suppose that current lens position data is 948 pulses in the chart. If the number of the pulses of active range data is greater than 1462 or smaller than 432, the lens is moved in the focusing direction first according to active range measurement data A, until the current lens position B is within the range of 1462 to 432 pulses. Then range measurement by the passive system is performed. In other words, passive range finding system 12 performs range measurement operation when the current lens position B is within 500 pulses in + and − directions of the measured range A. This prevents the passive range data from becoming excessively large, and permits shortening the range computing time. As a result focusing can be completed without putting an unnecessary burden on passive range finding system 12.

Furthermore, since operational switch from focusing by active range data to that by passive range data is executed in accordance with a specified procedural flow, the focusing is free from hunting at the time of switching or selecting of operation due to motor 32.

As described as above, according to the present invention, the device of which is provided with an active range finding system and a passive range finding system, active range finding is performed first, and then, in accordance with its result, one three procedures is followed: 1) the lens is focused according to active range data; 2) range finding is transferred to the passive system after driving the lens in the focusing direction according to the active range data, and focusing is completed according to the passive range data; or 3) focusing according to passive range begins immediately. The device appropriately uses the characteristics of respective systems to attain accurate focusing performance over a wide range, from the closest focusing distance to infinity, and in a reasonable time.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automatic focusing system for a lens comprising:
   an active range finding system;
   a passive range finding system;
   means for performing an initial range measurement by said active range finding system;
   focusing means for driving a focus of said lens according to range data from either said active range finding system and said passive range finding system;
   means for judging whether said range measurement is within a predetermined scope;
   means for updating a calculated current distance at which said lens is focused;
   means for calculating a degree of blur produced by a variance between the measured range and said calculated current distance; and
   means for controlling said focusing means by said active range finding system if said range measurement is within said predetermined scope;
   means for transferring control of focusing to said passive range finding system when said measured range is outside said predetermined scope and said degree of blur is less than a predetermined degree of blur.

2. An automatic focusing system according to claim 1, where said active range finding system includes:
   at least first and second light emitting elements;
   said first light emitting element emitting a first emitted light along a first path;
   said second light emitting element emitting a second emitted light along a second path;
   said first and second paths being non-parallel, whereby first and second spaced-apart objects are illuminated by said first and second emitted lights;
   at least first and second light receiving elements;
   said first light receiving element receiving said first emitted light reflected from said first object; and
   said second light receiving element receiving said second emitted light reflected from said second object.

3. An automatic focusing system according to claim 1, further comprising manual means for disabling said active range finding system and for enabling data from said passive range finding system to control the entire focusing operation.

* * * * *